April 21, 1964    F. J. ZAVASNIK ETAL    3,129,461
EXTRUSION OF THERMOPLASTIC TUBES Filed Dec. 19, 1960      4 Sheets-Sheet 1

INVENTORS
F. J. ZAVASNIK
RONALD HOLT
BY *Hudson and Young*

ATTORNEYS

April 21, 1964  F. J. ZAVASNIK ETAL  3,129,461
EXTRUSION OF THERMOPLASTIC TUBES
Filed Dec. 19, 1960  4 Sheets-Sheet 3

INVENTORS
F. J. ZAVASNIK
RONALD HOLT
BY Hudson and Young
ATTORNEYS

April 21, 1964    F. J. ZAVASNIK ETAL    3,129,461
EXTRUSION OF THERMOPLASTIC TUBES
Filed Dec. 19, 1960    4 Sheets-Sheet 4

INVENTORS
F. J. ZAVASNIK
RONALD HOLT
BY Hudson and Young
ATTORNEYS

United States Patent Office 3,129,461
Patented Apr. 21, 1964

3,129,461
EXTRUSION OF THERMOPLASTIC TUBES
Fredrick J. Zavasnik, Bartlesville, Okla., and Ronald Holt, Battle Creek, Mich., assignors to Phillips Petroleum Company, a corporation of Delaware
Filed Dec. 19, 1960, Ser. No. 76,898
6 Claims. (Cl. 18—14)

This invention relates to the manufacture of thermoplastic tubes. In one of its aspects it relates to the extrusion of thermoplastic tubes from materials having extremely high viscosities in the molten stage. In another of its aspects it relates to a method and means for the continuous extrusion of thermoplastic tubes at higher rates than have heretofore been possible.

The extrusion of thermoplastic pipe is known and thermoplastic materials such as polyethylene have been extruded to form pipes and tubes on a commercial scale. The polyethylene which has been extruded most successfully to produce pipes and tubes is produced by a polymer solution process such as that disclosed and claimed in U.S. Patent 2,825,721, issued March 4, 1958, to Hogan et al. More recently polyethylene has been produced by a polymer slurry process such as that described in copending application Serial No. 590,567, filed June 11, 1956, and now abandoned, by G. T. Leatherman et al., and in copending application Serial No. 625,005, filed November 29, 1956, and now abandoned, by W. B. Reynolds et al. Such polymers are produced as solid particles in a liquid hydrocarbon diluent at a temperature such that the polymer is substantially insoluble in the diluent. Polymers produced by the polymer slurry process exhibit much higher properties of melt viscosity than do polymers produced by the polymer solution process.

The viscosity of the molten polymer is usually identified by its melt index as determined by the ASTM methed D–1238–57T; the higher the viscosity of the molten polymer, the lower the value of the melt index. The polymer made by the polymer solution process will usually have a melt index value in the range of about 0.2 to about 6.5 or even higher as measured by the above method whereas polymer made by the polymer slurry process will have a melt index value of 0.000. In order to obtain a meaningful value of melt index it is necessary to increase the load on the melt by a factor of about 10. This modified test method is identified as Procedure F of the above ASTM test. Solution process polymers having melt index values of 0.2–1.0 according to the regular ASTM method were found to have melt index values of 19–85 according to the "High Load," or Procedure F method. Polymers produced by the slurry or suspension process have melt indices from 0.0 to about 4 according to the Procedure F test method.

With the advent of the newer, low melt index polymers, the present available methods for fabricating thermoplastic pipe have not been satisfactory. The extruded pipe surfaces emerging from the die openings are often rough and mottled. Furthermore, the melt temperatures of these low melt index polymers are significantly higher than those of the solution process polymers so that cooling of the polymer pipe to a self-supporting temperature has been difficult. It is also difficult to extract sufficient heat from the extrudate to prevent resoftening the surface by the sensible heat of the thermoplastic material.

It is an object of this invention to provide a method for extruding thermoplastic materials which is applicable to the low melt index polymers produced by the polymer slurry process and which is also applicable to polymers produced by the polymer solution process. It is also an object of this invention to provide a means for quenching the surface of extruded thermoplastic pipe as it emerges from the die so that the finish imparted to the pipe by the die is preserved. Still another object of this invention is to provide a means for extruding thermoplastic pipe and for supporting the extruded pipe until it becomes self-supporting. A further object of this invention is to provide an internal support for thermoplastic pipe as it is extruded with provision for controlling the temperature of the internal pipe support. Still another object of this invention is to provide a thermal barrier between the extrusion die and the forming die in a device for extruding thermoplastic pipe. Other and further objects and advantages of this invention will be apparent to one skilled in the art upon study of this disclosure including the detailed description of the invention and drawing wherein:

Figure 1:
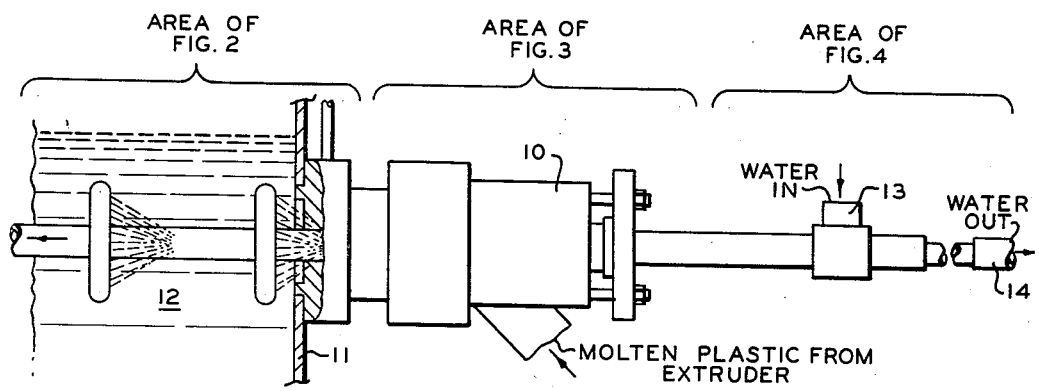
FIGURE 1 is an elevation, partly in section, of an extrusion device according to the invention.

Referring now to FIGURE 1, the crosshead die 10 receives molten polymer from a conventional extruder (not shown) and passes the molten polymer through an annular die, hereinafter described, and through a tank 11 containing a cooling fluid 12. Cooling water passes by means of manifold 13 through the support mandrel, hereinafter described, and is discarded by means of pipe 14.

Figure 2:
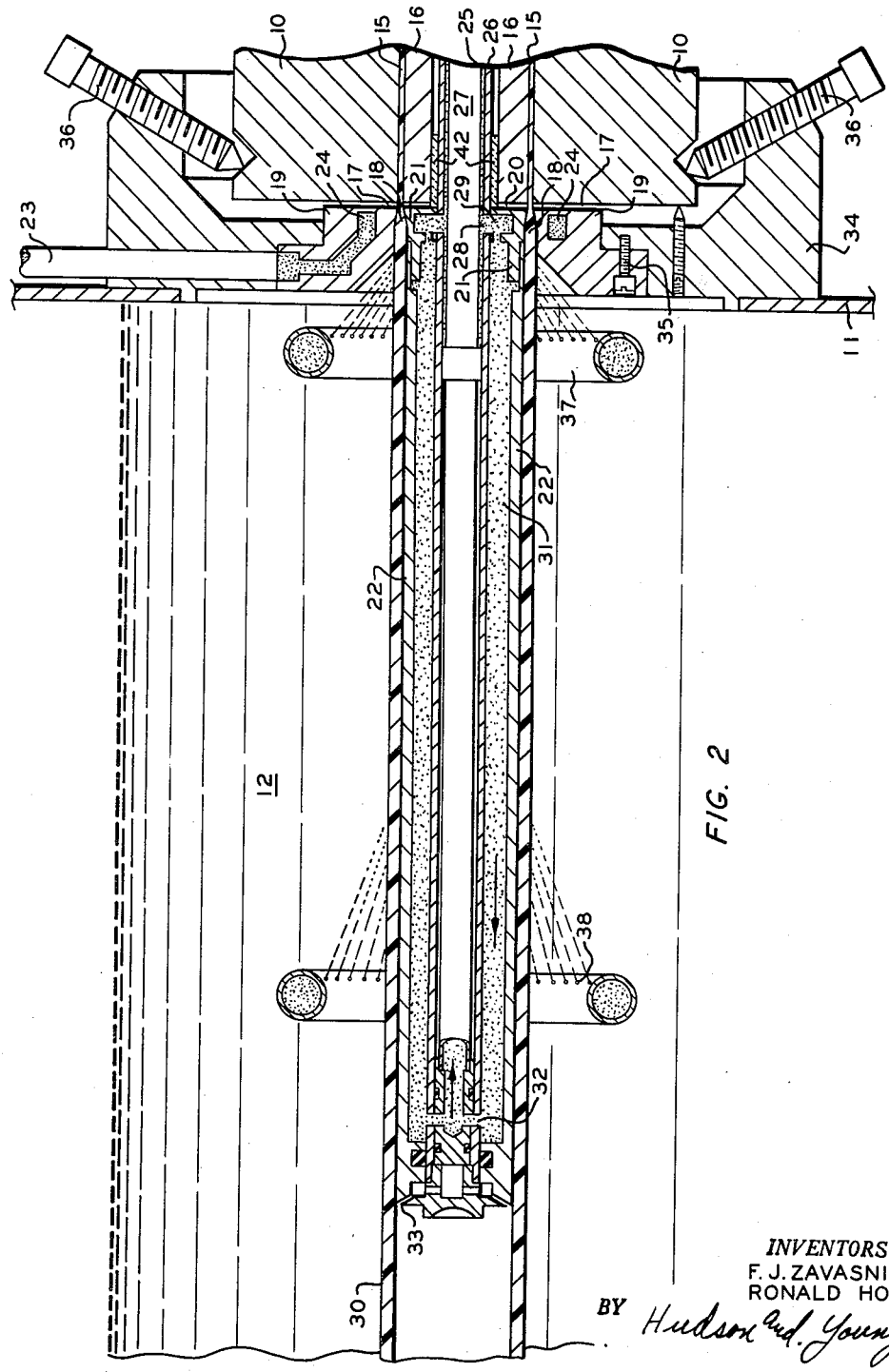
FIGURE 2 is a sectional elevation of a portion of FIGURE 1 designated as area of FIGURE 2.
Figure 5:
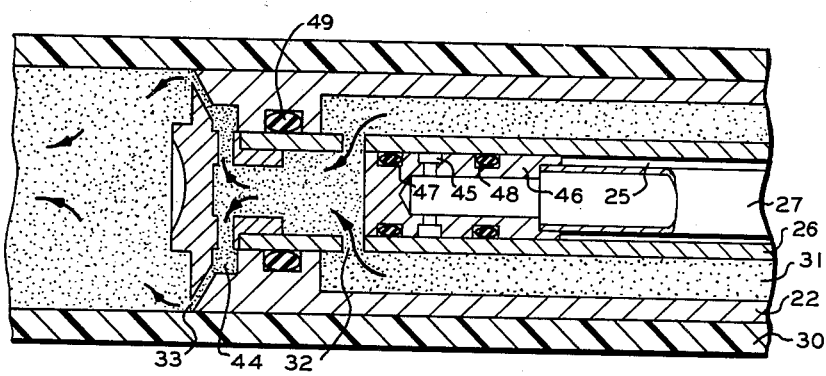
FIGURE 5 is a detail of the end of the internal pipe support shown in FIGURE 2.

Referring now to FIGURE 2, molten plastic is passed through the annular die 15, formed between the crosshead die 10 and the die mandrel 16. The plastic emerges from the annular die 15, traverses the thermal barrier identified as air spaces 17 and 20, and enters the forming die 18 which is formed between the outer forming ring 19 and the inner forming ring 21. The annular forming die 18 is of increased cross-sectional area as compared to the crosshead die 15 and is illustrated as having an initial diverging area followed by an area of enlarged but constant cross-sectional area. The forming die or forming ring 18 can be of constant but enlarged cross-sectional area instead of initial diverging area as shown. The inner surface of the annular forming die 18 is continued as support mandrel 22 which controls the internal diameter of the extruded pipe, supports the pipe until it is cooled sufficiently to become self-supporting, cools the inner surface of the extruded pipe, provides the finished surface to the interior of the pipe, and provides the required resistance to the pipe being removed from the forming die 18. The support mandrel 22 decreases slightly in over-all diameter from its junction with inner forming ring 21 to the end of the support mandrel in the extruded tube. The outer forming ring 19 is cooled by a cooling liquid introduced via conduit 23 to a water course 24. The cooling liquid is removed by means of a similar conduit (not shown). The inner forming ring 21 and the support mandrel 22 are cooled by a cooling liquid introduced via the annulus 25 which exists between pipes 26 and 27. These coaxial pipes are positioned in the support mandrel 22 so that cooling liquid traversing the annulus 25 passes out of openings 28 in pipe 26 and through the water course 29 in inner forming ring 21 and thence to the annulus 31 between pipe 26 and the support mandrel 22. The cooling liquid then passes through the openings 32 in pipe 26 and is passed to disposal via pipe 27 or passes out of the spray openings 33 to the interior of the plastic pipe 30 as shown in FIGURE 5. The outer forming ring 19 is secured to forming ring holder 34 by bolts such as shown at 35. Forming ring holder 34 is positioned by, and maintained in position by, bolts 36.

As the extrudate emerges from the annular forming ring 18, its outer surface is immediately quenched by a spray of cooling liquid passed thereupon from spray ring 37. The extrudate downstream from the annular forming die 18 is maintained submerged in a cooling liquid 12 maintained in tank 11. Another spray of cooling liquid is directed upon the outer surface of the thermoplastic pipe by means of a second spray ring 38.

Figure 6:
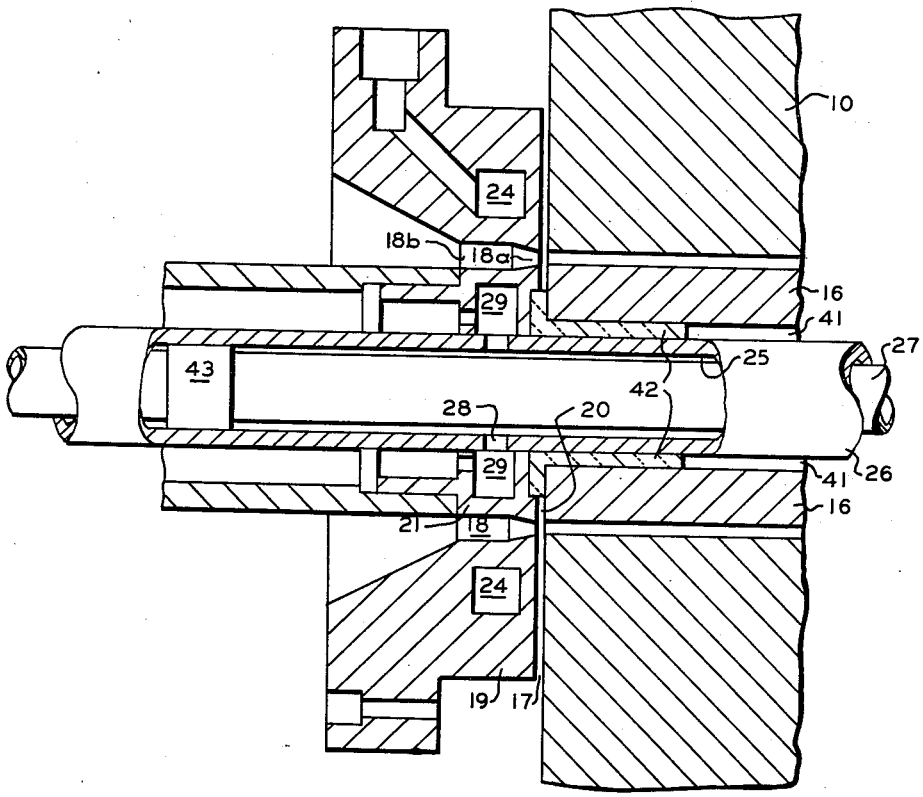
FIGURE 6 is a detail of the forming die shown in FIGURE 2.

Reference is now made to FIGURE 6 wherein the region of the forming die is shown in greater detail. It can be seen that an annular space 41 is provided between pipe 26 and die mandrel 16 and that this annular space is occupied by an insulating cylinder 42 at the exit end of the crosshead die 10. This insulating cylinder or sleeve can be made of a ceramic material or a high melting point resin such as polytetrafluoroethylene. The insulating sleeve 42 also acts as a thermal barrier between the crosshead die mandrel 16 and the inner forming ring 21. Collar 43 on pipe 27 serves to position pipe 27 in pipe 26. In FIGURE 6 it can be seen that the forming die 18 is made up of a section of increasing cross-sectional area indicated at 18a and a section of constant cross-sectional area 18b. The forming ring 18 provides for reshaping the extrudate which emerges from extruder die 15 and also acts as a water seal so that the exterior surface of the extruded tube of thermoplastic material can be quenched as it emerges from the forming die 18 whereby the finish which has been imparted to the exterior surface of the extruded tube will be preserved by the quench provided by the water bath and by the spray of water directed upon its surface.

FIGURE 5 is a detail of the end of the support mandrel of FIGURE 2 wherein the pipe 27 is withdrawn from the forward position shown in FIGURE 2 so that the cooling liquid in annulus 31 flows through the openings 32, through the water course 44 and out of the spray passages 33 to the interior of the extruded pipe 30. The outlet ports 45 in the member 46 secured to the end of pipe 27 are sealed on either side, with respect to pipe 26, by means of annular seal rings 47 and 48. Pine 26 is sealed with respect to support mandrel 22 by means of annular seal ring 49.

Figure 4:
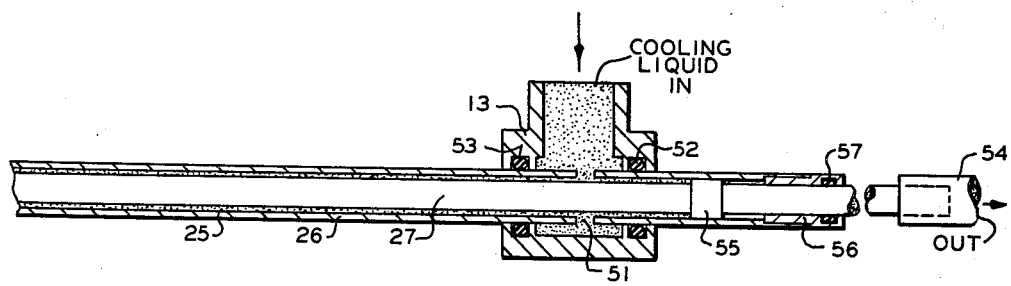
FIGURE 4 is a sectional elevation designated as the area of FIGURE 4.

FIGURE 4 shows the manifold 13 for introducing cooling liquid to the annulus 25 between pipes 26 and 27 through openings 51 in pipe 26. Annular ring seals 52 and 53 provide a seal between manifold 13 and pipe 26. Pipe 27, as shown, in FIGURES 2 and 4, is in the forward position with the cooling liquid being exhausted through pipe 27 and rubber hose 54. When the pipe 27 is retracted to the position shown in FIGURE 5, the collar 55 strikes the bushing 56. Annular seal ring 57 provides a seal between the bushing 56 and the pipe 27.

Figure 3:
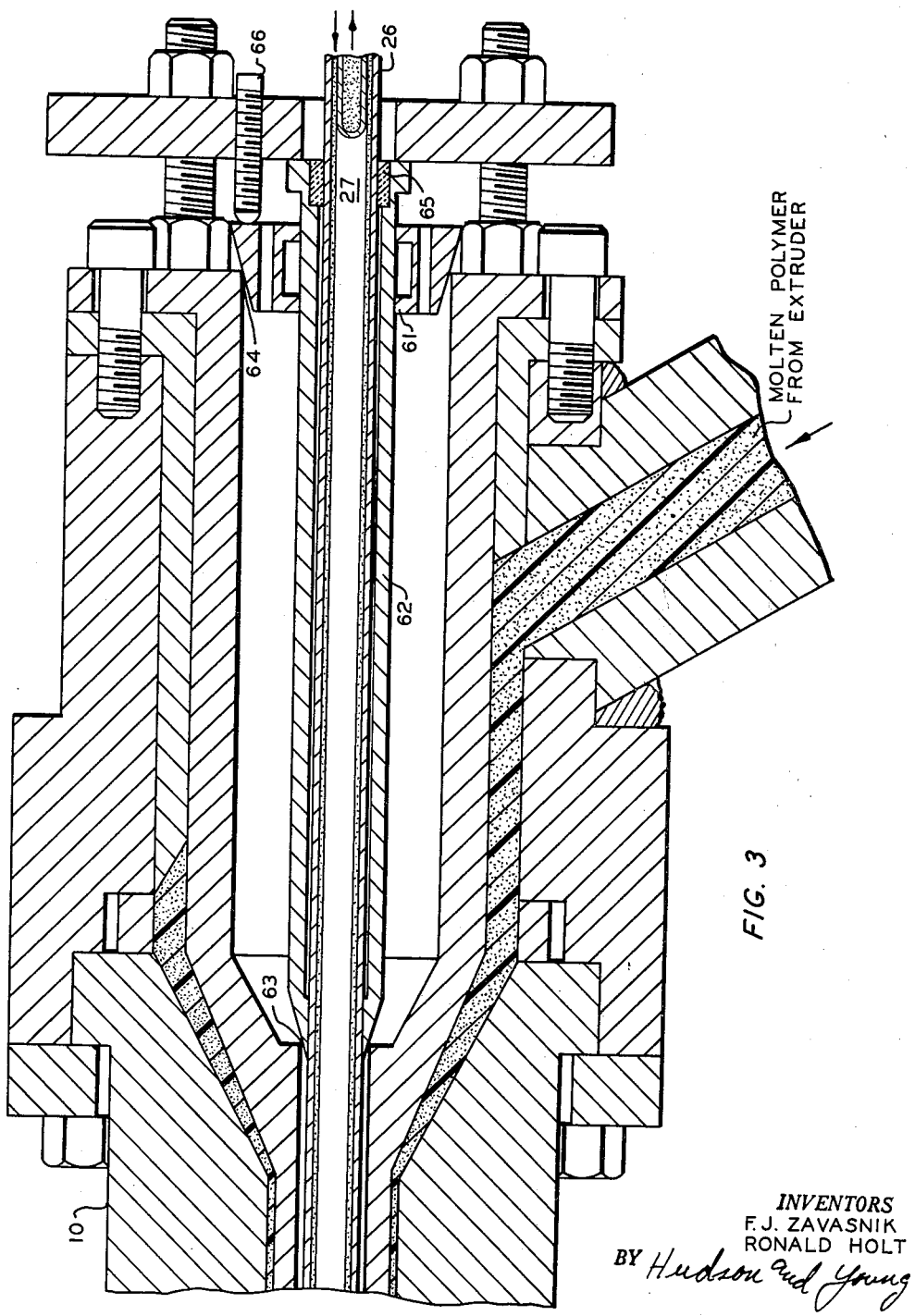
FIGURE 3 is a sectional elevation of that portion of FIGURE 1 designated as the area of FIGURE 3.

FIGURE 3 shows the crosshead die 10 and the positioning of coaxial pipes 26 and 27 therein. A spacing bushing 61 and a spacing sleeve 62 secure pipe 26 with respect to crosshead die 10 by point contact of the spacing sleeve 62 at 63 and by point contact of the spacing bushing 61 at point 64. An insulating ring 65 also aids in insulating pipe 26 from the crosshead die 10. The spacing bushing 61 is secured in position by set screw 66.

The device as above described has overcome the difficulties which have been encountered in the extrusion of pipes and tubes from high melt index polymers such as those produced by the polymer slurry process. The extrusion method which is accomplished by the above device basically comprises reshaping the extruded pipe wall so that it is forced to conform to the polish metal surfaces of the forming ring and the extrudate is immediately quenched upon leaving the forming ring by contact with a violently agitated cooling liquid. The extruded pipe is submerged in the cooling liquid and is supported until it has been sufficiently cooled to be self-supporting. The extrudate traverses a thermal barrier before entering the forming ring so that the extruded pipe can be contacted with the cooling liquid immediately upon leaving the forming ring without incurring undue cooling of the extrusion die. Utilization of the extrusion method which is made possible by the above device results not only in preserving the prepared surfaces of the extruded pipe but increases the temperature at which the thermoplastic shape is self-supporting due to a reduction in buoyancy forces exerted upon the submerged pipe because of the cooling water which is circulated through the interior of the extruded pipe.

The following is a description of the steps involved in the fabrication of a thermoplastic pipe, for example, a polyethylene pipe. The extrudate energes from the annular opening forced by the die and the die mandrel, traverses a thermal barrier, such as an air gap, and enters the forming ring which is a second annular opening having an increased cross-sectional area as compared to the annular opening between the die and the die mandrel. By adjustment of the pulley speed (not shown in the drawing), the extrudate linear speed through the forming ring is reduced so that the force exerted by the extruded material causes the extrudate to fill the larger annular cross-sectional of the forming ring. This action results in the now larger wall thickness pipe assuming the surface finish of the polished forming ring surfaces and also in providing an effecting water seal. The external surfaces of the formed pipe are cooled rapidly by violent, submerged cooling liquid sprays and the internal surfaces of the pipe are cooled by the extended water cooled mandrel which also supports the pipe until it has been cooled sufficiently to be self-supporting. The extended mandrel also provides the resistance required to reduce the linear speed of the extrudate emerging from the forming ring and to keep tension on the puller constant so as to produce pipe having uniform dimensions. The cooling liquid spray which is directed onto the surface of the extruded pipe increases heat transfer substantially and also prevents formation of steam bubbles on the surface of the pipe which would tend to produce a pockmarked or otherwise imperfect surface. The extruded pipe is maintained submerged in the cooling liquid until sufficient heat has been extracted from the pipe to prevent resoftening of the pipe surface due to the sensible heat of the thermoplastic pipe.

The extended mandrel design provides means for circulation of cooling liquid within the mandrel for starting the operation without having the cooling liquid inside the thermoplastic pipe. This facilitates starting the operation because the positive water seals are not obtained until a short time after the pipe has been pulled by hand to the puller mechanism and the pipe has been submerged in the cooling liquid. When operating conditions have been reached, as determined by pipe measurements, the exit water tube of the mandrel is pulled to the position shown in FIGURE 5, allowing the mandrel cooling liquid to exit through sprays at the end of the mandrel and to impinge on the thermoplastic surface walls. The volume of cooling water circulated through the mandrel should be great enough to fill the interior of the thermoplastic pipe and to submerge the spray.

The extrusion method which has been developed and implemented by the above-described device provides a number of advantageous and novel features including the following. The extrusion method of this invention improves the condition of the extrudate surfaces. Cooling of the thermoplastic is initiated at the maximum rate immediately when the extrudate leaves the forming ring surfaces thus preserving the surface imparted to the extrudate by the polished metal. Positive water seals are obtained thus allowing use of maximum cooling liquid spray agitation to improve heat transfer and to prevent formation of bubbles on the surface of the extrudate. An effective thermal barrier makes possible the quenching of the extrudate surface immediately upon emerging from the forming ring without undue cooling of the extrusion die. Positive water seals permit direct cooling of the internal pipe surface with a cooling liquid. Positive water seals make it possible to submerge the extrudate completely so as to prevent resoftening of the pipe surface by the sensible heat contained in the thermoplastic material, thus preserving the surface finish imparted by the forming ring. The use of internal cooling liquid results in a decrease of buoyancy forces exerted on the submerged pipe, thus minimizing distortion of the shape while in a self-supporting but softened condition. The use of the extended die mandrel results in minimum orientation due to absence of drawdown in cross-sectional area of the pipe.

The thermal barrier indicated by air spaces 17 and 20 in FIGURES 2 and 6 can also be a solid insulating material such as asbestos, a ceramic or a high melting point resin such as polytetrafluoroethylene. The thermal barrier will usually be from about 0.001 to about 0.015 inch in thickness whether it is an air space or a solid insulating material so far as the outer forming ring 19 and the die head 10 are concerned but the thermal barrier between the inner forming ring 21 and the die mandrel 16 can be eliminated because a metal-to-metal contact can be tolerated at this point. When the thermal barrier between the inner forming ring 21 and the die mandrel 16 is eliminated, the sleeve 42 will not have a shoulder which projects into the air space 20 but will be merely a centering sleeve around the tube 26. The spacing of the thermal barrier between the outer forming ring 19 and the die head 10 is accomplished by the positioning of bolts 36. The spacing of the thermal barrier between the inner forming ring 21 and the die mandrel 16 is accomplished by spacing the inner forming ring 21 in the proper position and securing the assembly of the inner forming ring 21, the mandrel extension 22 and pipe 26 by wedging elements 61 and 62 against the die head 10 by means of bolt 66.

The cross-sectional area of the annular forming die 18 can be greater than that of the annular die opening between die head 10 and mandrel 16 by about 1 to 50 percent and will usually be greater by about 20 to 30 percent.

A tube forming device as described and illustrated has been used to produce tubing from solid polyethylene having a melt index, according to ASTM method D-1238-57T, Procedure F of about 0.25, at the maximum capacity of the available extruder employed. The radius of the annular die between the crosshead die and the die mandrel, which corresponds to the wall thickness of the extrudate from the crosshead die, was 1/8 inch and the corresponding radius of the annular forming die was 3/16 inch. The diameter of the support mandrel adjacent the forming die was 0.928 inch and at the spray head end was 0.888 inch. The support mandrel was 7.75 inches in length from the forming die to the spray head. The wall thickness of the finished tube was about 0.122 inch. The external and internal surfaces of the tubing had a smooth, polished appearance. Tap water was used as cooling liquid at a temperature of about 68° F.

There is a natural tendency for a polymer or other thermoplastic tube to increase in diameter when emerging from a pressure zone, particularly in an extrusion process where the thermoplastic material is extruded in molten form. At normal extrusion rates this tendency for expansion is absorbed or dissipated in enlarged area of the forming die 18. The tendency of the polymer tube to increase in diameter when the restrictive pressure is removed becomes greater as the extrusion rate is increased so that at some high extrusion rate, determined by such variables as the ratio of cross-sectional area of the opening of forming die 18 to that of extruder die 15 and the natural tendency of the particular polymer to expand, the polymer tube loses contact with the surface of the water-cooled support mandrel 22. When this occurs, the stabilization and support of the mandrel are not obtained allowing the tube surfaces to become nonuniform and allowing the inside of the tube to revert to the dull surface that exists when the polymer tube emerges from the extruder die 15.

This condition can readily be overcome by increasing the diameter of the support mandrel a short distance downstream from the forming die 18 so as to compensate for the increase in diameter of the extruded tube. An increase in diameter of about 1 to about 3 percent will ordinarily be adequate for the higher extrusion rates and can readily be determined by observing the magnitude of expansion at the desired extrusion rate. The increase in diameter of the support mandrel should be gradual to avoid a sudden change in direction of travel of the polymer and to avoid an aggravation of the natural tendency of the polymer tube to increase in diameter. The over-all diameter of the support mandrel will be decreased from the enlarged portion to the end of the mandrel in the extruded tube as hereinbefore described because of the natural tendency of the tube to shrink as it is cooled by the cooling water.

That which is claimed is:

1. In apparatus for extruding thermoplastic tubular articles wherein molten thermoplastic material is forced through an annular extrusion die formed by the extrusion head and a mandrel, the improvement comprising an annular forming die of greater cross sectional area than that of said extrusion die, adjacent and spaced from said extrusion die so as to form a thermal barrier between said extrusion die and said forming die; a support tube coaxially positioned in said mandrel, comprising a continuation of the inner surface of said forming die and having a spray head at the end opposite the forming die; a first cooling liquid tube coaxially positioned in said support tube; a second cooling liquid tube coaxially positioned in said first cooling liquid tube; valve means communicating with the interior of said second cooling liquid tube and the annulus between said first cooling liquid tube and said support tube so as to pass cooling liquid from said annulus through said spray head when in a first position and through the interior of said second tube when in a second position; and means to contact the outer surface of the extruded tube with cooling liquid as it emerges from said forming die.

2. The apparatus of claim 1 wherein said first cooling liquid tube is in open ended communication with said spray head and has a port through its side spaced from said open end; and wherein said second cooling liquid tube is slidably positioned in said first cooling liquid tube, has a closed end adapted to close the open end of said second cooling liquid tube when positioned adjacent the open end, and has a port through its side spaced from said closed end so as to be in communication with the port through the side of said first cooling liquid tube when the closed end of said second cooling liquid tube closes the open end of said first cooling liquid tube.

3. The apparatus of claim 1 wherein a means is provided to vary the space between said forming die and said extrusion die.

4. The apparatus of claim 1 wherein a means is provided to submerge the extruded tube emerging from the forming die immediately in a cooling liquid.

5. Apparatus for extruding tubular thermoplastic articles comprising a cross head extrusion die having a molten thermoplastic inlet and an outlet; a tubular die mandrel positioned in said outlet so as to form an annular extrusion die between said cross head die and said die mandrel; a first cooling fluid tube coaxially positioned in said die mandrel and having each open end extending externally from said cross head die; a support tube having an external diameter less than that of said die mandrel coaxially enclosing that portion of said first cooling fluid tube which extends externally from said cross head die in the direction of flow of extrudate; a spray head operatively connected to the adjacent open ends of said support tube and said first cooling fluid tube; means to seal the annulus between said support tube and said first cooling fluid tube adjacent said annular extrusion die; a forming ring member having an internal diameter greater than that of the outlet of said cross head extrusion die, spaced from said extrusion die in downstream relationship with respect to flow of extrudate and adjacent said annular extrusion die; means to cool said ring member; means to center said first cooling fluid tube in said die mandrel; means to position said first cooling fluid tube and said support tube with respect to said annular extrusion die; a second cooling fluid tube coaxially and slidably positioned in said first cooling fluid tube; means to pass cooling fluid to the annulus between said first and second cooling fluid tubes at a point upstream from said annular extrusion die; means to pass cooling fluid from said annulus between said first and second cooling fluid tubes to the annulus between said first cooling fluid tube and said support tube; means to pass cooling fluid from the annulus between said first cooling fluid tube and said support tube to said spray head when said slidable second cooling fluid tube is in a first position and to the interior of said second cooling fluid tube when said slidable second cooling fluid tube is in a second position; means to remove cooling fluid from said second cooling fluid tube; means to submerge extrudate in cooling fluid immediately downstream from said forming ring member; and means to spray cooling fluid upon the external surface of the submerged extrudate.

6. The method of fabricating continuous, self-supporting, tubular thermoplastic articles which comprises passing molten thermoplastic material through a first annular die, across a thermal barrier and through a second annular die of greater cross-sectional area than that of said first annular die; contacting the internal surface of the extruded tube with a support mandrel to reduce the linear speed of the extruded tubular thermoplastic material emerging from said second annular die so that the extruded tube is forced to assume the shape of the second die thereby forming a liquid-tight seal between the extruded tube and the second die; continuously contacting the internal surface of the extruded tube with said mandrel until the extruded tube has become self-supporting; passing cooling liquid through the mandrel in indirect heat exchange with the extruded tube and then into direct contact with the internal surface of the tube; contacting the exterior of the extruded tube with cooling liquid immediately as it emerges from said second die; maintaining the interior and exterior surfaces of said tube in contact with cooling liquid until said tube is cooled to below its softening point; and recovering said tube as said tubular article.

References Cited in the file of this patent

UNITED STATES PATENTS

| | | |
|---|---|---|
| 2,032,171 | Hewitt | Feb. 25, 1936 |
| 2,097,684 | Atkinson | Nov. 2, 1937 |
| 2,417,165 | Jacobson | Mar. 11, 1947 |
| 2,443,053 | Parmelee | June 8, 1948 |
| 2,461,630 | Cozzo | Feb. 15, 1949 |
| 2,512,844 | Weber | June 27, 1950 |
| 2,519,375 | Jargstorff et al. | Aug. 22, 1950 |
| 2,902,716 | Colombo | Sept. 8, 1959 |
| 2,952,873 | Porter | Sept. 20, 1960 |